G. W. BAIRD.
Aerating and Cooling Apparatus.
No. 159,142. Patented Jan. 26, 1875.
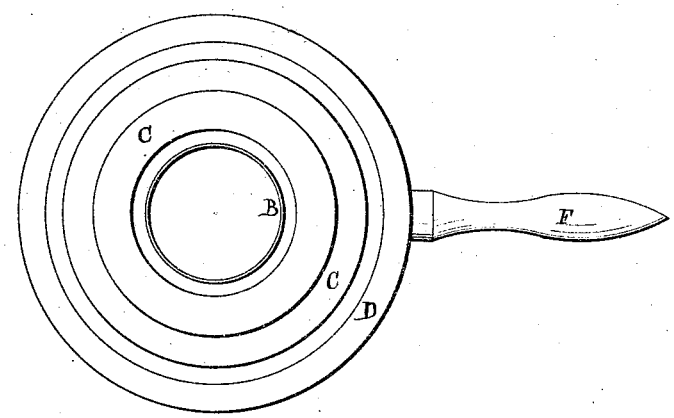
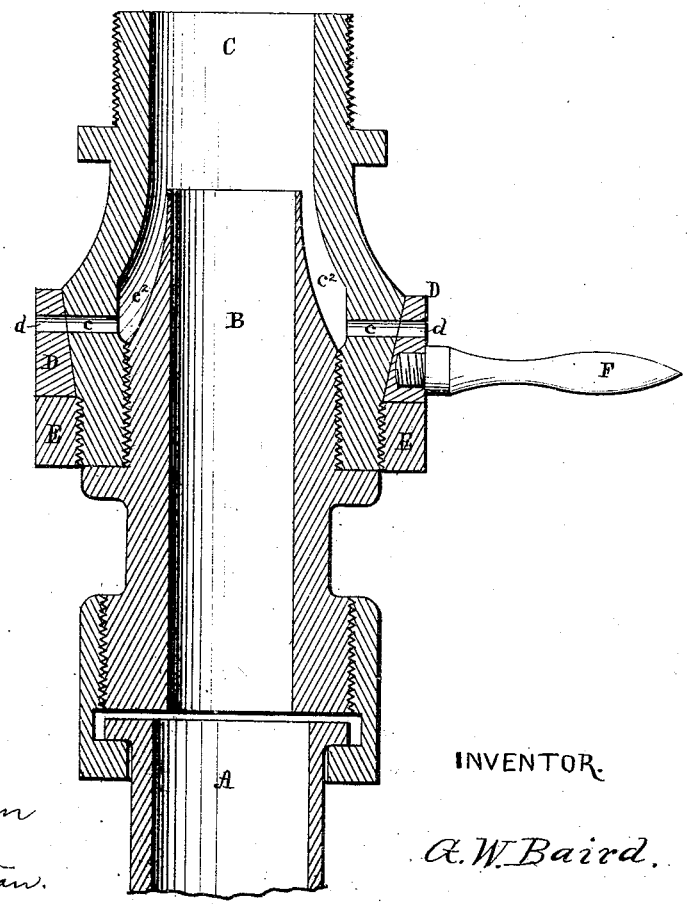
WITNESSES:
INVENTOR:

UNITED STATES PATENT OFFICE.

GEORGE W. BAIRD, OF UNITED STATES NAVY.

IMPROVEMENT IN AERATING AND COOLING APPARATUS.

Specification forming part of Letters Patent No. 159,142, dated January 26, 1875; application filed January 5, 1875.

*To all whom it may concern:*

Be it known that I, GEORGE W. BAIRD, an officer in the Engineer Corps of the United States Navy, have invented an improved apparatus or device for effecting the aeration and cooling of distilled water and other liquid products of distillation, of which the following is a specification:

This invention relates to that class of apparatus for which Letters Patent No. 93,852 were heretofore granted to me on the 17th day of August in the year 1869, and consists of the parts described, as follows, as will appear by reference to the drawing forming part of this specification, in which—

A is the steam-pipe from any boiler or evaporator, connected by any suitable steam-tight joint to the hollow plug or pipe B of uniform bore. This plug B is stationary and non-adjustable, and to it is attached by a steam-tight screw-joint the nozzle C, also stationary and non-adjustable. To this nozzle C a suitable pipe is attached by a steam-tight joint, which pipe leads to the proper compartment of any distilling or condensing apparatus. In the nozzle C are a number of orifices or holes, $c\,c$, which lead into the annular space $c^2$, formed by the respective interior and exterior curved surfaces of nozzle C and plug B. Upon the exterior tapered surface of nozzle C is fitted the ring D, whose interior surface is bored to the taper of the nozzle C, and the two surfaces are united by a ground joint. Holes $d\,d$ are formed in ring D similar to holes $c\,c$ in nozzle C. Ring D is backed by a nut or follower, E, which is set up on nozzle C by means of screw-threads, as seen in the drawing, and whose forward face forms a steam-tight joint with the rear face of ring D. These two faces may, if desired, be ground together. In ring D is tapped radially a short lever or levers, F, serving as a convenient handle or handles for rotating ring D, said ring having no motion axially, being adjusted to its seat by nut E.

The operation of this aerator can now be readily understood. To put it in operation the holes $c\,c$ in nozzle C are closed by turning ring D until the spaces between holes $d\,d$ lap the holes $c\,c$. Steam or other condensible vapor is then admitted through the pipes A and B and nozzle C into the condenser or distilling apparatus. When the current of vaporized liquid is fairly in motion and condensation commenced in the distiller, thus forming a partial vacuum therein, the ring D is turned so as to admit through holes $d\,d\,c\,c\,a$ current of air properly proportioned to the partial vacuum existing in the annular chamber $c^2$, caused by condensation, when the said condensation of the steam or other vapor, and the aeration and refrigeration of the liquid products of distillation are simultaneously effected as long as it is desired to continue the operation.

Experience having determined the existence of certain mechanical defects in the apparatus for which Letters Patent were granted to me as hereinbefore mentioned, the said defects have been remedied in this invention, in which a much smaller tapered ground joint is employed, and the nozzle C provided exteriorly with such joint is combined with a neater, cheaper, and lighter device—ring D—in order to regulate the admission of air. All leakage of steam is obviated, which leakage was unavoidable in the former means employed for regulating by a screw-thread the opening of the passage for the entering air. No fluted plug is required in this apparatus. The curves in the walls of the chamber $c^2$ are such as are best adapted for commingling the air and steam, and the device, as a whole, as shaped, arranged, and combined, is neater, cheaper, lighter, more efficient in work, and more durable in its movable wearing parts.

Having thus fully described this apparatus as my invention, I claim—

The combination of the plug B, the nozzle C, and the ring D, all constructed substantially as described, for the purposes set forth.

G. W. BAIRD.

Witnesses:
W. S. C. REDMAN,
FRED. G. MCKEAN.